(12) United States Patent
Hwang

(10) Patent No.: US 11,486,157 B2
(45) Date of Patent: Nov. 1, 2022

(54) BOOTH MODULE FOR EXHIBITION, BOOTH FOR EXHIBITION, AND METHOD FOR INSTALLING SAME

(71) Applicant: Eun Tae Hwang, Seoul (KR)

(72) Inventor: Eun Tae Hwang, Seoul (KR)

(*) Notice: Subject to any disclaimer, the term of this patent is extended or adjusted under 35 U.S.C. 154(b) by 201 days.

(21) Appl. No.: 16/978,431

(22) PCT Filed: Mar. 14, 2019

(86) PCT No.: PCT/KR2019/002934
§ 371 (c)(1),
(2) Date: Sep. 4, 2020

(87) PCT Pub. No.: WO2019/182286
PCT Pub. Date: Sep. 26, 2019

(65) Prior Publication Data
US 2021/0047851 A1    Feb. 18, 2021

(30) Foreign Application Priority Data
Mar. 21, 2018  (KR) .................. 10-2018-0032690

(51) Int. Cl.
*E04H 1/12*       (2006.01)
*E04B 1/343*      (2006.01)
(Continued)

(52) U.S. Cl.
CPC ....... *E04H 1/1272* (2013.01); *E04B 1/34315* (2013.01); *E04B 1/34384* (2013.01);
(Continued)

(58) Field of Classification Search
CPC ....... E04H 1/12; E04H 1/1222; E04H 1/1227; E04H 1/1272; E04H 1/1205;
(Continued)

(56) References Cited

U.S. PATENT DOCUMENTS 4,142,809 A * 3/1979 Shell ................. F16B 12/34
                                                    403/201
4,558,713 A * 12/1985 Hagler .............. E04H 15/34
                                                    135/159
(Continued)

FOREIGN PATENT DOCUMENTS

KR    20-1992-0005374 Y1    8/1992
KR    20-2010-0010846 U    11/2010
(Continued)

*Primary Examiner* — Kyle J. Walraed-Sullivan
(74) *Attorney, Agent, or Firm* — Novick, Kim & Lee PLLC; Jae Youn Kim

(57) ABSTRACT

A booth module for exhibition includes: a frame; a main body dowel; a bolt detachably coupled to the main body dowel; and a cap dowel detachably coupled to the bolt, wherein the main body dowel has: a body having a bolt insertion hole formed therein; a button of which a part is inserted and installed in the body through a button installation hole formed in the body; and a spring installed inside the body and pushing one end of the button, and wherein the cap dowel has: a body having a bolt insertion hole formed therein; a button of which a part is inserted and installed in the body through a button installation hole formed in the body; and a spring installed inside the body and pushing one end of the button, wherein the buttons are provided with bolt through holes communicating with the bolt insertion holes.

8 Claims, 16 Drawing Sheets

(51) Int. Cl.
*F16B 9/00* (2006.01)
*F16B 5/02* (2006.01)
*F16B 37/08* (2006.01)

(52) U.S. Cl.
CPC ............... *F16B 5/02* (2013.01); *F16B 9/054* (2018.08); *F16B 37/0857* (2013.01)

(58) Field of Classification Search
CPC ............... E04H 15/008; E04B 1/34315; E04B 1/34321; E04B 1/34384; E04B 2002/7479; E04B 2002/7474; E04B 2002/7477; E04B 2/74; E04B 2/76; F16B 9/054; F16B 9/056; F16B 5/02; F16B 37/0857; G09F 15/00
USPC ......... 411/433, 437, 546; 21/9, 18; 160/135; 135/119
See application file for complete search history.

(56) References Cited

U.S. PATENT DOCUMENTS

| | | | | | |
|---|---|---|---|---|---|
| 4,776,721 | A * | 10/1988 | Lange | ................ | E04B 1/34384 403/171 |
| 4,778,487 | A * | 10/1988 | Chenel | ................ | E04H 1/1272 403/255 |
| 4,954,032 | A * | 9/1990 | Morales | ............. | F16H 25/2006 411/289 |
| 5,054,950 | A * | 10/1991 | Zillgen | .................... | F16B 7/18 403/171 |
| 5,115,623 | A * | 5/1992 | Ahlberg | ............. | G09F 15/0068 52/109 |
| 5,302,039 | A * | 4/1994 | Omholt | ................ | E04B 2/7401 24/135 R |
| 5,560,502 | A * | 10/1996 | Hsiung | ................. | A47B 43/04 211/195 |
| 5,680,737 | A * | 10/1997 | Sheipline | ............. | F16B 7/0453 403/205 |
| 5,749,691 | A * | 5/1998 | Campbell | ........... | F16B 37/0864 411/270 |
| 5,785,480 | A * | 7/1998 | Difeo | .................. | F16B 37/0857 411/436 |
| 6,370,803 | B1 * | 4/2002 | Burquest | ................ | G09F 17/00 40/607.1 |
| 6,553,698 | B1 * | 4/2003 | Kemeny | ............. | G09F 15/0068 52/646 |
| 6,829,869 | B1 * | 12/2004 | Savoie | ................ | G09F 15/0068 52/645 |
| 7,461,485 | B2 * | 12/2008 | Toledo | .................. | E04H 15/008 135/114 |
| 7,874,090 | B2 * | 1/2011 | Flagg | .................. | G09F 15/0068 211/175 |
| 8,132,979 | B2 * | 3/2012 | Orava | ................... | E04B 1/0023 52/302.1 |
| 9,697,755 | B1 * | 7/2017 | Zhang | ................ | G09F 15/0025 |
| 10,217,388 | B1 * | 2/2019 | Alkas | ..................... | A47B 57/30 |
| 11,255,367 | B2 * | 2/2022 | Clasen | ................. | E04B 1/1903 |
| 11,327,447 | B2 * | 5/2022 | Cui | ...................... | E04H 17/163 |
| 2004/0074155 | A1 * | 4/2004 | Toledo | .................. | E04H 15/008 52/63 |
| 2011/0250034 | A1 * | 10/2011 | Swanson | ................ | F16B 5/0692 411/103 |
| 2011/0303819 | A1 * | 12/2011 | Kuo | ...................... | E04H 1/1272 248/636 |
| 2013/0180182 | A1 * | 7/2013 | Yoo | ....................... | E04H 1/1272 52/27 |
| 2013/0255895 | A1 * | 10/2013 | Toledo | ..................... | E06B 3/80 160/382 |
| 2014/0047791 | A1 * | 2/2014 | Carnes | ..................... | E04C 3/28 52/655.1 |
| 2017/0356178 | A1 * | 12/2017 | Corbett | ............... | E04B 1/34315 |
| 2018/0291614 | A1 * | 10/2018 | Evert | ........................ | E04H 9/06 |
| 2020/0002940 | A1 * | 1/2020 | Jung | ....................... | E04H 1/1272 |
| 2022/0110451 | A1 * | 4/2022 | Hanna | ................ | E04B 1/34357 |

FOREIGN PATENT DOCUMENTS

| | | |
|---|---|---|
| KR | 20-2011-0001689 U | 2/2011 |
| KR | 10-1192551 B1 | 10/2012 |
| KR | 20-2013-0004564 U | 7/2013 |
| KR | 10-1458089 B1 | 11/2014 |

* cited by examiner

BOOTH MODULE FOR EXHIBITION, BOOTH FOR EXHIBITION, AND METHOD FOR INSTALLING SAME

TECHNICAL FIELD

The present invention relates to a booth module for exhibition, a booth for exhibition and a method for installing the same, on which a panel may be simply installed by pressing and then releasing a button of a dowel.

BACKGROUND ART

In general, a booth for exhibition is used in various events, exhibitions, symposiums, expositions, etc., and an advertisement panel inscribed with characters or figures is adhered to the outer surface of the booth.

Booths for exhibition are installed using structures manufactured on site from wood or steel, and recently, booths for exhibition are installed by assembling booth modules on site.

Dowels are used as units for fixing panels to booth modules for exhibition.

In general, dowels are used to assemble various pieces of furniture, such as a closet, a bookshelf, a shelf, etc., to adhere an advertisement panel, a panel, etc. to a specific structure or a wall, to construct a booth at an exhibition, to make a frame, or to hang a frame on a wall.

In an exhibition, a booth is constructed using booth modules, and a panel is adhered to a frame using dowels.

FIGS. 1 to 4 are views illustrating a conventional dowel and adhesion of a panel to a booth module using the same, and particularly, FIG. 1 illustrates a dowel body 200, FIG. 2 illustrates a booth module 900, and FIGS. 3 and 4 illustrate adhesion of a panel 500 to the booth module using a dowel body 200 and a dowel cap 100.

Right-angle brackets 800 are fastened to the inner surfaces of the corners of the conventional booth module 900, the booth module 900 of FIG. 2 are coupled to other booth modules using bolts and nuts to construct a booth, screw threads of the dowel bodies 200 are coupled to screw holes of the right-angle brackets 800 located on the front surface of the booth module, and the dowel caps 100 are fastened to a panel 500 one by one, as shown in FIGS. 3 and 4.

Conventionally, in order to adhere a panel to the booth module, the right-angle brackets 800 are fastened to the inner surfaces of the corners of the booth module 900, the dowel bodies 200 are threadedly engaged with screw holes of the right-angle brackets 800 one by one, the panel 500 is coupled to the dowel bodies 200, and then the dowel caps 100 are fastened thereto one by one.

Since the above conventional booth has a structure in which the panel is coupled to the dowel bodies through threaded engagement between bolts and nuts and takes a long time to fasten one dowel to the booth module, if there are a lot of booths on which panels are to be installed, productivity and work efficiency are greatly lowered.

That is, conventionally, in order to construct booths at exhibitions and expositions, thousands to tens of thousands of dowels must be fastened to booth modules by hand one by one.

Accordingly, it takes a long time to install one panel, and thus, if installation and disassembly of the panel need to be performed within a short time, many people are required in a narrow space, thereby raising installation costs and disassembly costs, and increasing a risk of accidents due to increased fatigue and congestion of workers (when many workers are in a small work space in an exhibition area, work efficiency is remarkably lowered).

Further, in the conventional block booth, to which the panel is simply coupled by threaded engagement, as time passes or when a small impact is applied, there is a risk of loss of the dowels and the panel, and, when the panel including an advertisement panel fixed using the dowels has a large size, there is a risk of accidents due to falling of the panel.

DISCLOSURE

Technical Problem

Therefore, the present invention has been made in view of the above problems, and it is an object of the present invention to provide a booth module for exhibition and a booth for exhibition, which may be conveniently installed in a one-touch manner and prevent loss of dowels, and a method for installing the same.

Technical Solution

In accordance with an aspect of the present invention, the above and other objects can be accomplished by the provision of a booth module for exhibition configured to construct a booth for exhibition, the booth module for exhibition including a frame, a main body dowel (10), a bolt (40) detachably coupled to the main body dowel (10), and a cap dowel (30) detachably coupled to the bolt (40), wherein the main body dowel (10) includes a body (12) having a bolt insertion hole (121) formed therein, a button (11), a part of which is inserted into the body to be installed therein through a button installation hole (123) formed in the body (12), and a spring (14) installed inside the body (12) so as to push one end of the button (11), and wherein the cap dowel (30) includes a body (32) having a bolt insertion hole (321) formed therein, a button (31), a part of which is inserted into the body to be installed therein through a button installation hole (323) formed in the body (32), and a spring (34) installed inside the body (32) so as to push one end of the button (31), wherein the buttons (11, 31) are provided with bolt through holes (111, 311) communicating with the bolt insertion holes (121, 321).

In accordance with a further aspect of the present invention, there is provided a booth module for exhibition configured to construct a booth for exhibition, the booth module for exhibition including a frame, a main body dowel (10), a bolt (40) detachably coupled to the main body dowel (10), and an intermediate dowel (20) and a cap dowel (30) detachably coupled to the bolt (40), wherein the main body dowel (10) includes a body (12) having a bolt insertion hole (121) formed therein, a button (11), a part of which is inserted into the body to be installed therein through a button installation hole (123) formed in the body (12), and a spring (14) installed inside the body (12) so as to push one end of the button (11), wherein the intermediate dowel (20) includes a body (22) having a bolt insertion hole (221) formed therein; a button (21), a part of which is inserted into the body to be installed therein through a button installation hole (223) formed in the body (22), and a spring (24) installed inside the body (22) so as to push one end of the button (21), and wherein the cap dowel (30) includes a body (32) having a bolt insertion hole (321) formed therein, a button (31), a part of which is inserted into the body to be installed therein through a button installation hole (323) formed in the body (32), and a spring (34) installed inside the body (32) so as to push one end of the button (31), wherein the buttons (11, 21, 31) are provided with bolt through holes (111, 211, 311) communicating with the bolt insertion holes (121, 221, 321).

In any one of the two types of the booth modules for exhibition, each of the bodies may include a pin hole formed in a direction parallel to a corresponding one of the bolt insertion holes, each of the buttons may include a long hole formed in a direction parallel to a corresponding one of the bolt through holes, and the pin hole and a part of the long hole may communicate with each other and a pin is installed in the pin hole and the long hole.

In any one of the two types of the booth modules for exhibition, a screw thread configured to be threadedly engaged with a screw thread of the bolt may be formed on a portion of an inner surface of each of the bolt through holes.

In any one of the two types of booth modules for exhibition, the body (12) of the main body dowel (10) may include front and rear surfaces, and a bolt head recess (124) may be formed on the rear surface around the bolt insertion hole (121).

In any one of the two types of the booth modules for exhibition, a spring recess configured to place a corresponding one of the springs therein may be formed in one end of each of the buttons, which contacts the spring.

In accordance with another aspect of the present invention, there is provided a booth for exhibition including a plurality of booth modules for exhibition corresponding to any one of the two types of the booth modules for exhibition, and a plurality of panels (500) adhered to the booth modules through the bolts (40).

In accordance with yet another aspect of the present invention, there is provided a method for installing a booth for exhibition, the method including preparing a plurality of the booth modules (700), pressing the buttons (11) of the main body dowels (10) and fastening the bolts (40) to the main body dowels (10), inserting the bolts (40) into holes of a panel (500), and pressing the buttons (31) of the cap dowels (30) and fastening the cap dowels (30) to the bolts (40).

In accordance with still yet another aspect of the present invention, there is provided a method for installing a booth for exhibition, the method including preparing a plurality of the booth modules (700) for exhibition, pressing the buttons (11) of the main body dowels (10) and fastening the bolts (40) to the main body dowels (10), pressing the buttons (21) of the intermediate dowels (20) and fastening the intermediate dowels (20) to the bolts (40), inserting the bolts (40) into holes of a panel (500), and pressing the buttons (31) of the cap dowels (30) and fastening the cap dowels (30) to the bolts (40).

In any one of the two methods, the preparing the booth modules (700) may include fastening the booth modules (700) to each other.

Advantageous Effects

A booth module for exhibition, a booth for exhibition and a method for installing the same according to the present invention have the following effects.

First, a panel may be installed by inserting dowels into bolts simply by pressing buttons of dowels once, and thus, the booth for exhibition is conveniently installed and a time taken to install the booth for exhibition is significantly reduced.

Second, the time taken to install the booth for exhibition and the personnel required to install the booth for exhibition are reduced, and thus, personnel expenses are greatly reduced. If booths are generally installed in an exhibition, it takes about 2 hours for 3 people to install two booths having a simple structure, and it takes about 2-3 hours for 5 people to install two booths having a complex structure, whereas when the booth module according to the present invention is used, it takes about 40-50 minutes for 2 people to install two booths having a simple structure, and it takes about 1 hour for 3 people to install two booths having a complex structure.

Third, installation of the booth for exhibition and disassembly of the booth for exhibition are rapid and simple, and thus, the booth for exhibition is appropriate for an exhibition or the like requiring rapid installation and disassembly of booths used therein.

Fourth, in case that booths for exhibition need to be installed or disassembled within several hours, a work space is narrow and thus the number of people able to perform the work is limited, even if many workers are employed at great expense, it may be difficult to complete the work within several hours and fatigue and stress of the workers are greatly increased when the work is rapidly performed in a narrow space, but, in the booth module and the method for installing the same according to the present invention, installation and disassembly of the booth module are very easy and simple, it is possible to install and disassemble the booth module with the minimum number of people permitted in a narrow space, fatigue and stress of the workers are decreased, and thus, a risk of accidents is reduced.

Fifth, since a spring continuously presses the button and the inner surface of a bolt through hole of the bolt, which is provided with a screw thread formed thereon, continuously presses the bolt, the panel may be securely adhered to the booth module without loosening of the screw coupling force and loss of the dowel may be prevented, thereby being capable of preventing accidents due to falling of the installed panel.

Sixth, any bolt provided with a screw thread formed thereon, such as a hex bolt or a headless bolt, may be used, and thus the booth module for exhibition has excellent field applicability.

Seventh, the booth for exhibition is easily installed and disassembled using the booth module provided with one-touch dowel sets, and may thus be reused anytime, thereby aiding recycling of materials and resource saving.

Eighth, if a bolt having a bolt head is used, by forming a structure in which the bolt head is engaged with a bolt head recess, the bolt head recess serves as an engagement protrusion, and thereby, even when the restoring force of the spring is weakened due to usage thereof for a long time, the bolt head remains engaged with the bolt head recess, and thus, the bolt 40 may not be easily removed, and particularly, if the bolt 40 is installed on the ceiling of the booth for exhibition such that the bolt head faces upwards and the bolt body faces downwards (i.e., in a vertical direction or in an inclined direction), the bolt head is engaged with the bolt head recess and thus the bolt is prevented from being released downwards, thereby allowing the booth for exhibition to be more securely installed.

*Brief Description of Reference Numerals*

Figure 1:
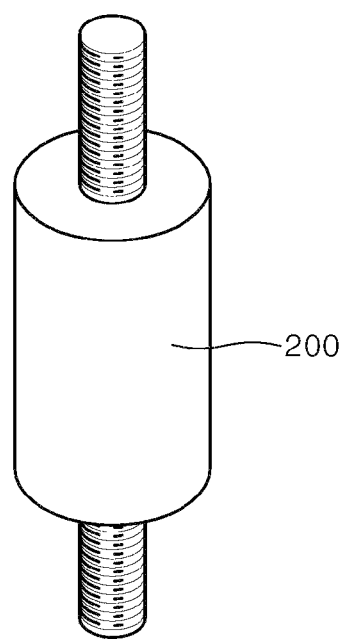
FIG. 1 is a perspective view of a conventional dowel body (200).
Figure 2:
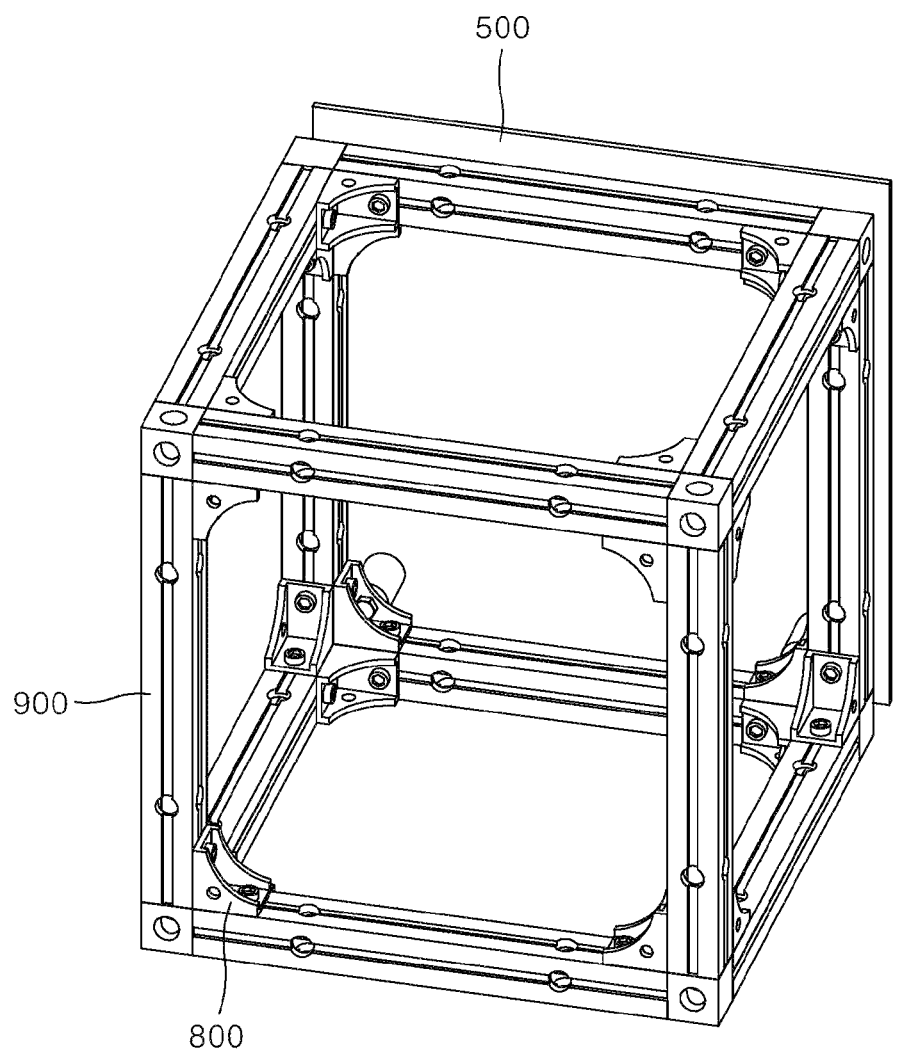
FIG. 2 is a perspective view of a conventional booth module (900).
Figure 3:
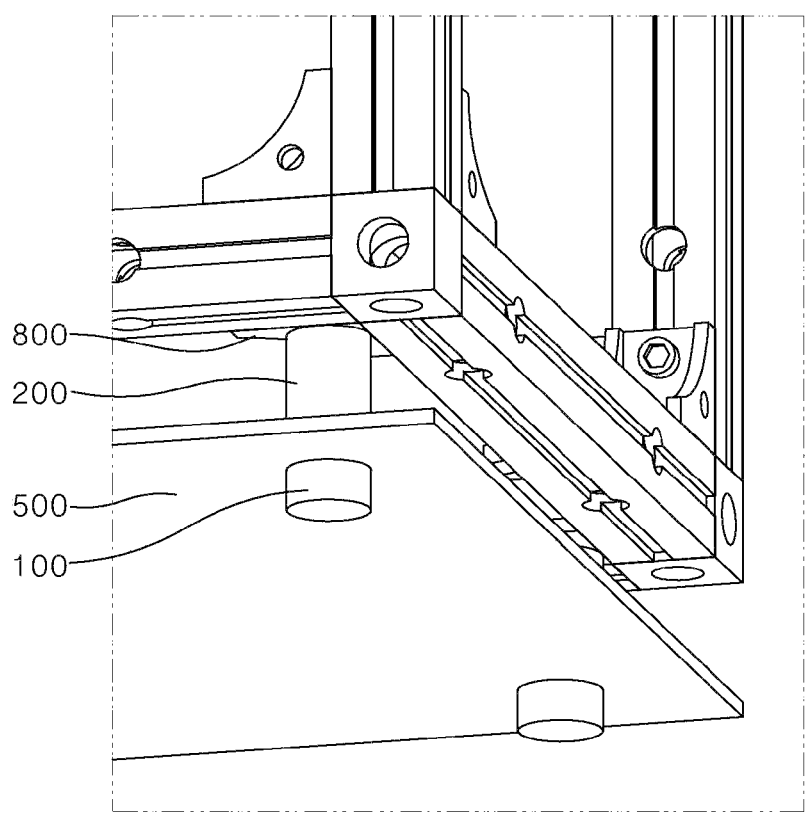
FIGS. 3 and 4 are perspective views of the conventional booth module, to which a panel is coupled.
Figure 4:
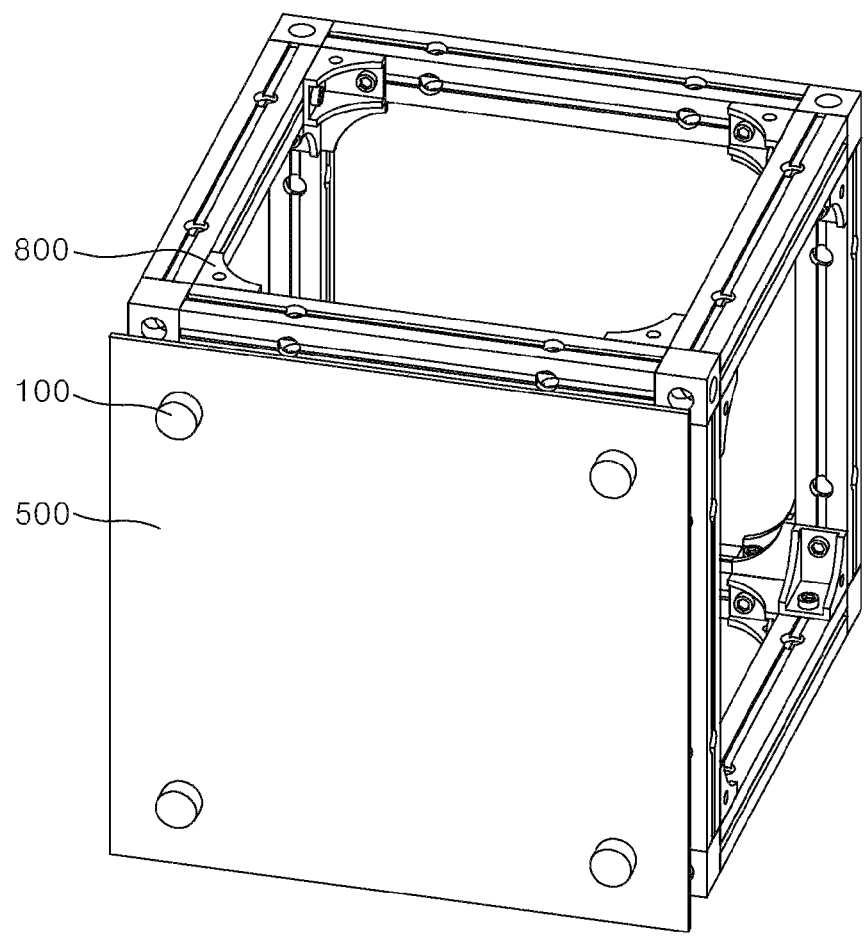
Figure 5:
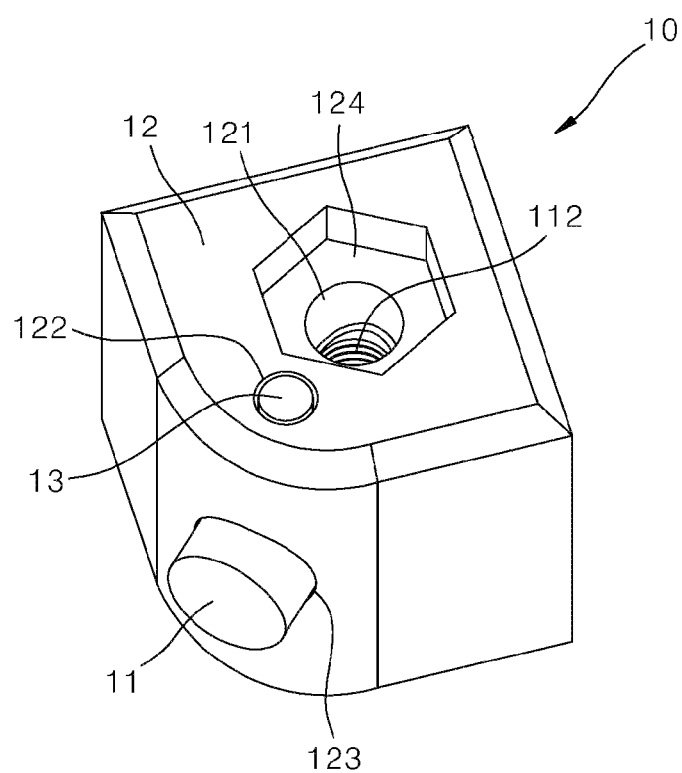
FIGS. 5 and 6A-6B are views of a main body dowel (10) according to the present invention, illustrating the rear surface of a body (12).

| | |
|---|---|
| 10. main body dowel | 11. button |
| 111. bolt through hole | 112. screw thread |
| 113. long hole | 114. spring recess |
| 12. body | 121. bolt insertion hole |
| 122. pin hole | 123. button installation hole |
| 124. bolt head recess | 13. pin |
| 14. spring | |
| 20. intermediate dowel | 21. button |
| 211. bolt through hole | 212. screw thread |
| 213. long hole | 214. spring recess |
| 22. body | 221. bolt insertion hole |
| 222. pin hole | 223. button installation hole |
| 23. pin | 24. spring |
| 30. cap dowel | 31. button |
| 311. bolt through hole | 312. screw thread |
| 313. long hole | 314. spring recess |
| 32. body | 312. bolt insertion hole |
| 322. pin hole | 323. button installation hole |
| 33. pin | 34. spring |
| 40. bolt | 500. panel |
| 700. booth module | |
| 100. dowel cap | 200. dowel body |
| 800. right-angle bracket | 900. booth module (conventional) |

MODE FOR INVENTION

Hereinafter reference will be made in detail to various embodiments of the present invention, examples of which are illustrated in the accompanying drawings and described below. While the invention will be described in conjunction with exemplary embodiments, it will be understood that the present description is not intended to limit the invention to the exemplary embodiments. Further, in order to clearly describe the present invention, in the drawings, parts, which are not related with the following description, will be omitted, and the same or similar elements will be denoted by the same reference numerals even though they are depicted in different drawings. In the following description of the embodiments, it will be understood that, when a part is said to "include" an element, the part may further include other elements, and does not exclude the presence of other elements unless stated otherwise. Hereinafter, the exemplary embodiments of the present invention will be described in detail with reference to the accompanying drawings.

First, a one-touch dowel and a one-touch dowel set which are fastened to a bolt and used to fix a panel 500 will be described first, and thereafter, how to apply the one-touch dowel to a booth module and a method for installing a booth for exhibition will be described in detail.

The one-touch dowel set according to the preset invention is roughly divided into three parts.

Figure 15:
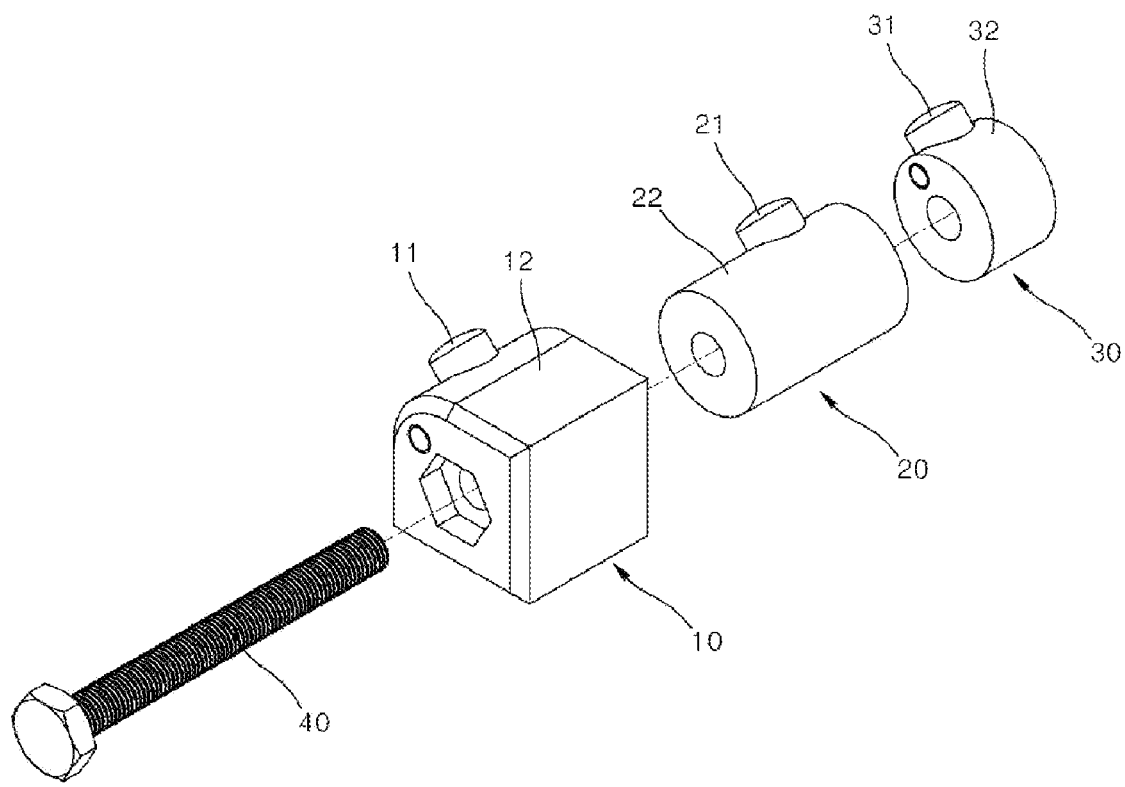
FIG. 15 is an exploded perspective view illustrating fastening of the main body dowel (10), the intermediate dowel (20), and the cap dowel (30) according to the present invention to a bolt.

That is, as shown in FIG. 15, the one touch dowel includes a main body dowel 10, an intermediate dowel 20, and a cap dowel 30.

The main body dowel 10 is coupled to the head of a bolt 40, the intermediate dowel 20 is additionally used between the main body dowel 10 and the cap dowel 30 depending on the length of the bolt, and the cap dowel 30 is used as a finishing dowel for fastening the panel 500.

Referring to FIG. 15, the bolt 40 is fastened to the main body dowel 10 first, the intermediate dowel 20 is then fastened to the bolt 40, and the cap dowel 30 is finally fastened thereto.

Figure 17:
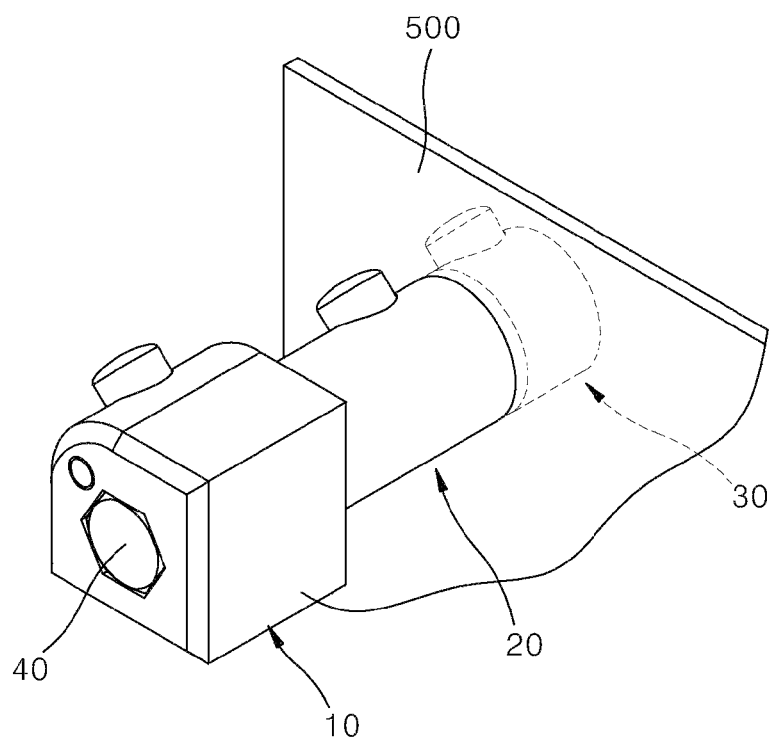
FIGS. 17 and 18 are views illustrating installation of the main dowel (10), the intermediate dowel (20) and the cap dowel (30) according to the present invention on a panel.
Figure 18:
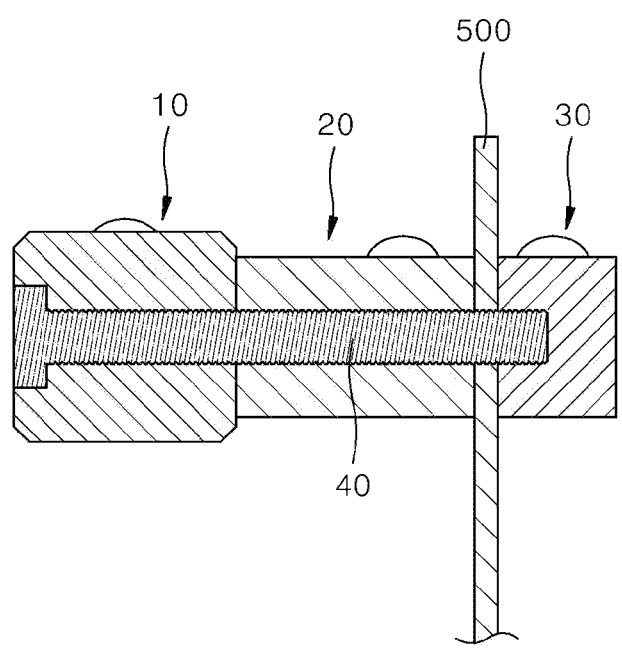

Referring to FIGS. 17 and 18, after the main body dowel 10 and the intermediate dowel 20 are sequentially fastened to the bolt 40, the panel 500 is inserted into to the bolt 40, and then the cap dowel 30 is finally fastened to the bolt 40.

Here, the main body dowel 10 may be used in the state in which the main body dowel 10 is fixed in advance to a booth module or a frame, to which the panel 500 is to be adhered, by welding or bolt-coupling, and the shapes of the main body dowel 10, the intermediate dowel 20 and the cap dowel 30, which are shown in the figures, may be modified so as to match the conditions of the booth module or the frame.

Hereinafter, the structures of the main body dowel 10, the intermediate dowel 20 and the cap dowel 30 and how they are fastened to the bolt in a one-touch manner will be described in detail. The main body dowel 10, the intermediate dowel 20 and the cap dowel 30 are named depending on the positions of the bolt, to which they are fastened, and the same principle is applied to fastening of the main body dowel 10, the intermediate dowel 20 and the cap dowel 30 to the bolt.

Therefore, the operating structure of the main body dowel 10 will be described first, and thereafter, referring to redundant parts thereof, the operating structures of the intermediate dowel 20 and the cap dowel 30 will be described.

The main body dowel 10 will be described in detail in FIGS. 5 to 8.

As shown in FIGS. 5 to 8, the main body dowel 10 includes a body 12 having a bolt insertion hole 121 formed therein, a button 11, a part of which is inserted into the body to be installed therein through a button installation hole 123 formed in the body 12, and a spring 14 installed inside the body 12 so as to push one end of the button 11.

A bolt through hole 111 communicating with the bolt insertion hole 121 is formed in the button 11, and a screw thread 112, which is threadedly engaged with the screw thread of the bolt, is formed on a portion of the inner surface of the bolt through hole 111 close to the spring 14.

Figure 6A:
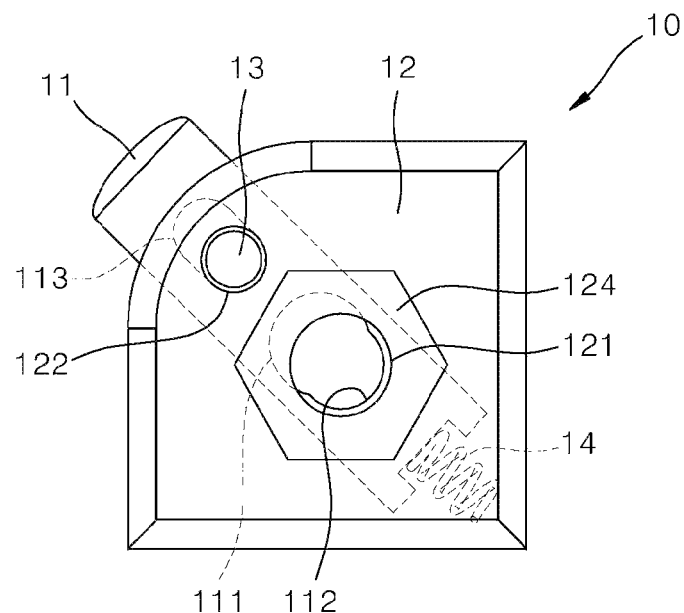
Figure 6B:
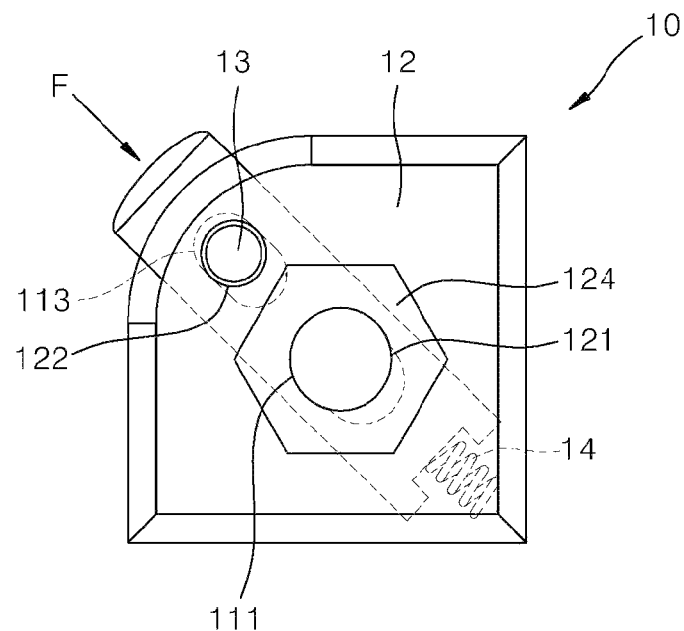
Figure 7:
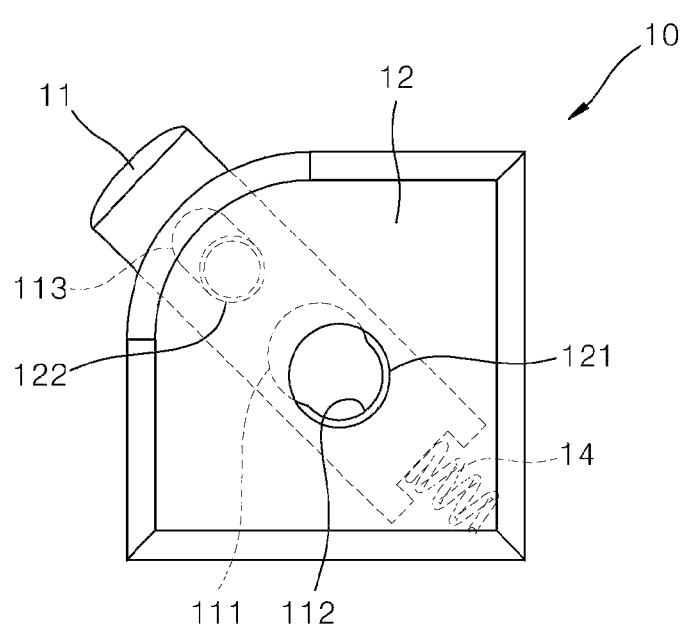
FIGS. 7 and 8 are views of the main body dowel (10) according to the present invention, illustrating the front surface of the body (12).
Figure 8:
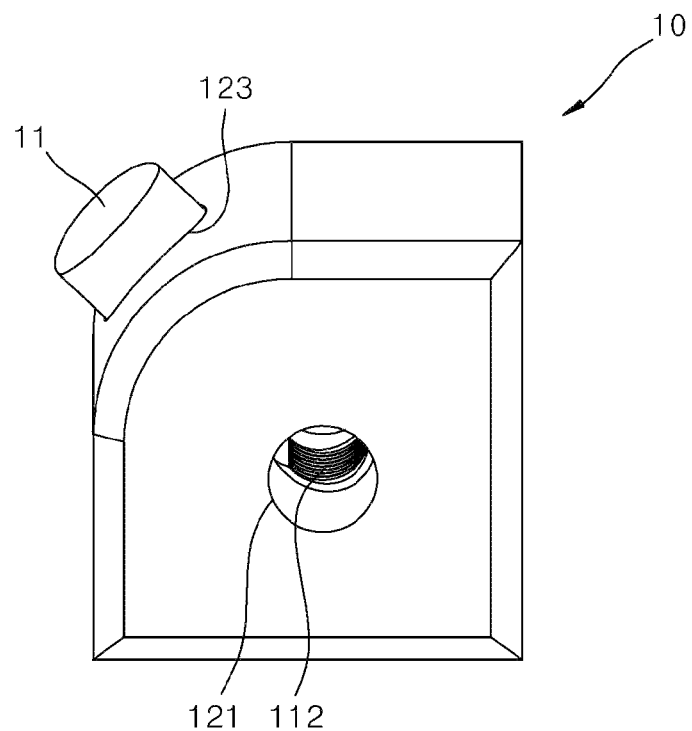
Figure 9:
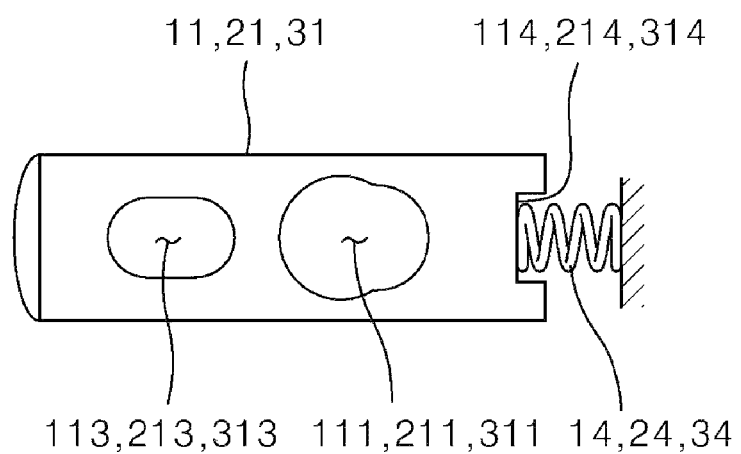
FIGS. 9 and 10 are views illustrating the detailed configuration of a button (11, 21 or 31) according to the present invention.
Figure 10:
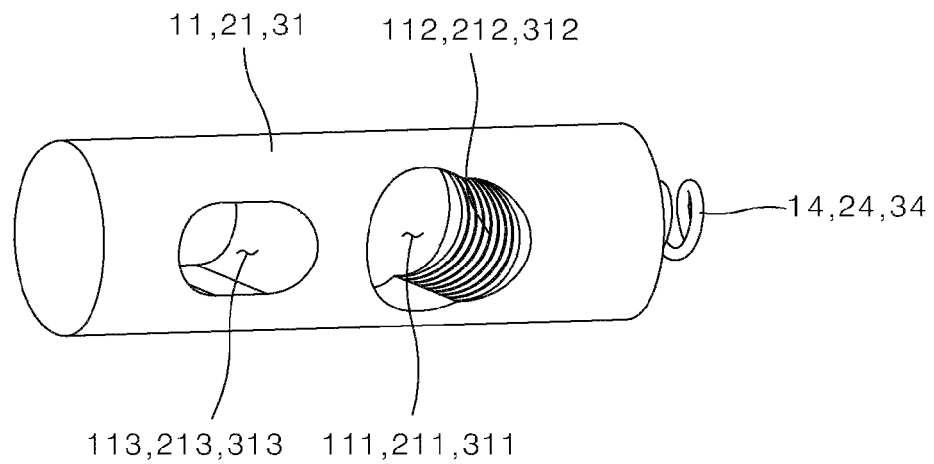

Further, a pin hole 122 is formed in the body 12 in a direction parallel to the bolt insertion hole 121, a long hole 113 is formed in the button 11 in a direction parallel to the bolt through hole 111, the pin hole 122 and a part of the long hole 123 communicate with each other, as shown by a dotted line in FIGS. 6A-6B and 7, and a pin 13 is installed in the pin hole 122 and the long hole 113.

A spring recess 114 is formed in a part of a button 11, which contacts the spring 14, thereby being capable of more stably installing the spring 14 therein.

The screw thread 112, which may be threadedly engaged with the screw thread of the bolt, is formed on the portion of the inner surface of the bolt through hole 111 of the button 11, which is close to the spring 14, and in normal times, when a worker does not apply force to the button 11, the screw thread 112 is located inside the bolt insertion hole 121 of the body 12 and the button 11 protrudes considerably outwards due to the restoring force of the spring 14 (in FIG. 6A).

The button 11 is movable in the axial direction of the button by the length of the long hole 113, force is applied to the button 11 in a direction towards the part thereof which protrudes outwards from the body 12 due to the restoring force of the spring in normal times (in FIG. 6A), and at this time, the button 11 is not moved outwards any further because the pin 13 is inserted into the long hole 113.

As shown in FIG. 6B, when the worker presses the button 11 towards the body 12 in the direction F, as shown in FIG. 6B, the spring 14 is compressed, the button 11 is moved into the main body 12, the screw thread 112 is moved towards the spring 13, and thus, the bolt insertion hole 121 of the body 12 becomes empty.

When the worker releases the force from the button, the button is returned to an original position thereof due to the restoring force of the spring, as shown in FIG. 6A.

Fastening of the bolt 40 to the main body dowel 10 will be described below, if the worker wants to fasten the bolt 40 to the main body dowel 10, when the worker presses the button 11 in the direction F in FIG. 6B→the spring is compressed→the screw thread 112 located inside the bolt insertion hole 121 of the body 12 is moved towards the spring, and nothing is engaged with the bolt insertion hole 121 of the body 12→after the bolt 40 is completely inserted into the bolt insertion hole 121 of the body (the bolt is easily inserted thereinto because there is no screw thread)→when the worker removes his/her hands from the button 11, the button is moved in the opposite direction to the direction of the pressing force of the worker→the screw thread 112 always presses the screw thread of the bolt 40 due to the restoring force of the spring and thus firmly fasten the bolt.

A bolt head recess 124 is formed on the rear surface of the body 12 (with reference to FIGS. 5 and 6A-6B), and the head of the bolt 40 is placed in the bolt head recess.

Figure 16:
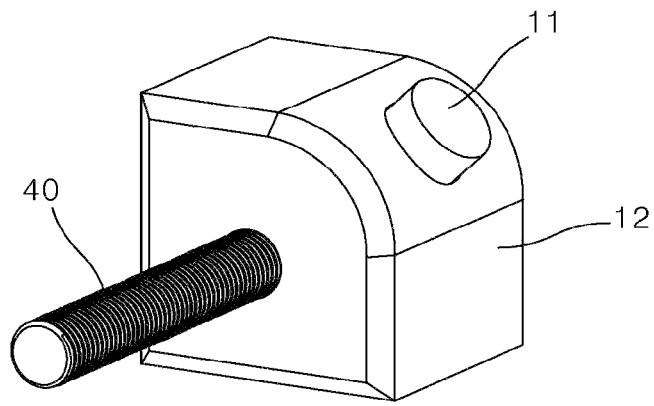
FIG. 16 is a perspective view illustrating the bolt (40) fastened to the main body dowel (10) according to the present invention.

FIG. 16 illustrates fastening of the bolt 40 to the main body dowel 10.

Figure 11:
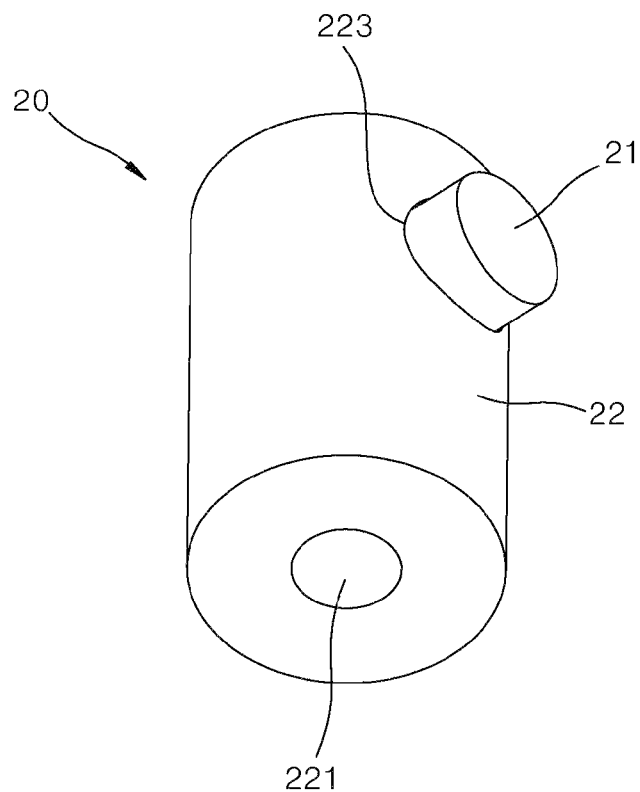
FIGS. 11 and 12 are views of an intermediate dowel (20) according to the present invention.
Figure 12:
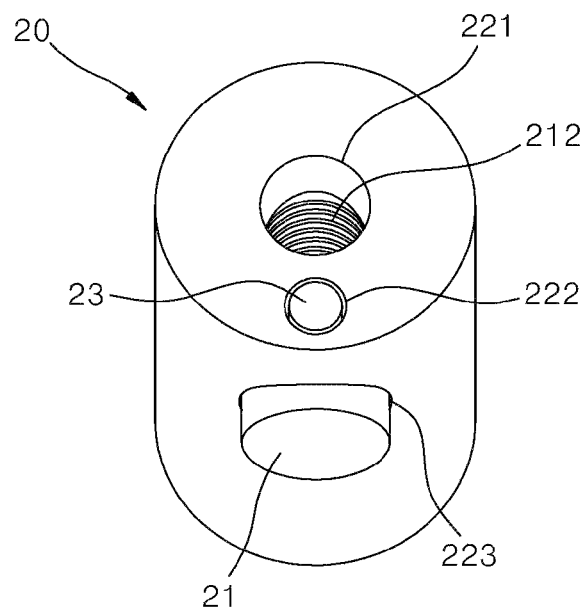

FIGS. 11 and 12 illustrate the intermediate dowel 20.

The intermediate dowel 20 includes a body 22 having a bolt insertion hole 221 formed therein, a button 21, a part of which is inserted into the body to be installed therein through a button installation hole 223 formed in the body 22, and a spring 24 installed inside the body 22 so as to push one end of the button 21.

A bolt through hole 211 communicating with the bolt insertion hole 221 is formed in the button 21, and a screw thread 212, which is threadedly engaged with the screw thread of the bolt, is formed on a portion of the inner surface of the bolt through hole 211 close to the spring 24.

Further, a pin hole 222 is formed in the body 22 in a direction parallel to the bolt insertion hole 221, a long hole 213 is formed in the button 21 in a direction parallel to the bolt through hole 211, the pin hole 222 and a part of the long hole 223 communicate with each other, and a pin 23 is installed in the pin hole 222 and the long hole 213.

The screw thread 212, which may be threadedly engaged with the screw thread of the bolt, is formed on the portion of the inner surface of the bolt through hole 211 of the button 21, which is close to the spring 24.

Figure 13:
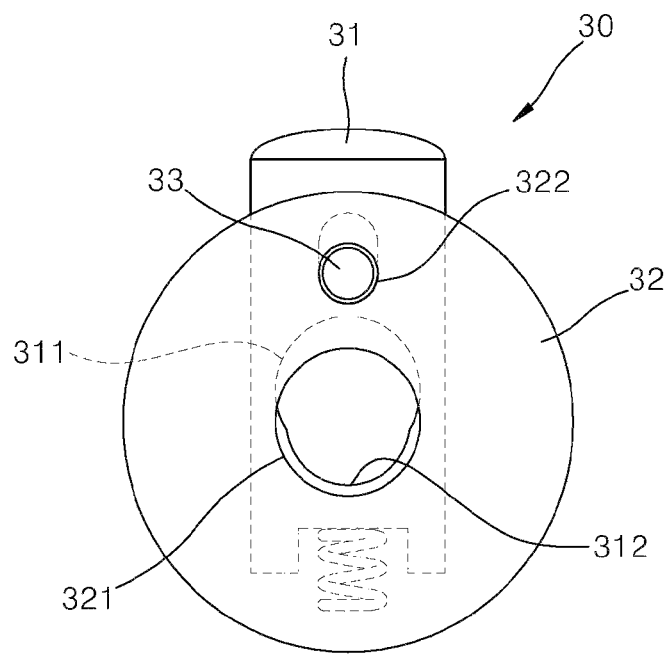
FIGS. 13 and 14 are views of a cap dowel (30) according to the present invention.
Figure 14:
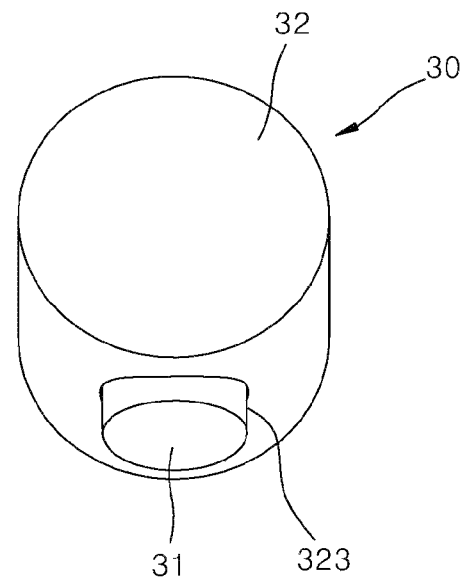

FIGS. 13 and 14 illustrate the cap dowel 30.

The cap dowel 30 includes a body 32 having a bolt insertion hole 321 formed therein, a button 31, a part of which is inserted into the body to be installed therein through a button installation hole 323 formed in the body 32, and a spring 34 installed inside the body 32 so as to push one end of the button 31.

A bolt through hole 311 communicating with the bolt insertion hole 321 is formed in the button 31, and a screw thread 312, which is threadedly engaged with the screw thread of the bolt, is formed on a portion of the inner surface of the bolt through hole 311 close to the spring 34.

Further, a pin hole 322 is formed in the body 32 in a direction parallel to the bolt insertion hole 321, a long hole 313 is formed in the button 31 in a direction parallel to the bolt through hole 311, the pin hole 322 and a part of the long hole 323 communicate with each other, and a pin 233 is installed in the pin hole 322 and the long hole 313.

The screw thread 312, which may be threadedly engaged with the screw thread of the bolt, is formed on the portion of the inner surface of the bolt through hole 311 of the button 21, which is close to the spring 34.

The intermediate dowel 20 and the cap dowel 30 differ from each other in that the bolt insertion hole 211 of the intermediate dowel 20 vertically passes through the body of the intermediate dowel 20 but the bolt insertion hole 321 of the cap dowel 30 does not pass through the body of the cap dowel 30. The cap dowel 30 is used for finishing after installation of the panel, and thus must hide the bolt.

The above-described principle of fastening the main body dowel 10 to the bolt is identically applied to fastening of the intermediate dowel 20 and the cap dowel 30 to the bolt.

The body of the main body dowel 10 includes the front and rear surfaces, the bolt head recess 124 is formed on the rear surface around the bolt insertion hole, and thus, when a general bolt having a bolt head is used, the bolt head is placed in the bolt head recess and thus the bolt may be more stably fastened thereto.

By forming such a structure in which the bolt head is engaged with the bolt head recess, the bolt head recess serves as an engagement protrusion, and thereby, even when the restoring force of the spring is weakened due to usage thereof for a long time, the bolt head is engaged with the bolt head recess, and thus, the bolt 40 may not be easily removed.

Further, if the bolt 40 is installed on the ceiling of the booth for exhibition such that the bolt head faces upwards and the bolt body faces downwards (i.e., in a vertical direction or in an inclined direction), the bolt head is placed in the bolt head recess and thus the bolt is prevented from being removed downwards.

Although FIGS. 15, 17 and 18 illustrate an embodiment in which the main body dowel 10, the intermediate dowel 20 and the cap dowel 30 are integrated into one set, if the bolt 40 is short or the panel or the advertisement panel is thick, the intermediate dowel may be omitted, and if the bolt is long or the panel or the advertisement panel is desired to be spaced apart from the structure by a designated distance or more, two or more intermediate dowels 20 may be used.

Now, referring to FIGS. 19 to 21, a booth module for exhibition, a booth for exhibition and a method for installing the booth for exhibition will be described.

A booth module 700 for exhibition may include a frame formed of an aluminum profile or a metal pipe, the main body dowels 10, the bolts 40 detachably coupled to the main body dowels 10, and the cap dowels 30 detachably coupled to the bolts 40.

Alternatively, the booth module 700 for exhibition may include a frame formed of an aluminum profile or a metal pipe, the main body dowels 10, the bolts 40 detachably coupled to the main body dowels 10, and the intermediate dowels 20 and the cap dowels 30 detachably coupled to the bolts 40.

As described above, if the bolts 40 are short or a panel or an advertisement panel is thick, the booth module for exhibition may not include the intermediate dowels, and, if the bolts are long or the panel or the advertisement panel is desired to be spaced apart from the structure by a designated distance or more, the booth module for exhibition may include one or more intermediate dowels.

In both types of the booth modules for exhibition, the main body dowels 10 must be adhered to the frames, and here, the main body dowels 10 may be bonded to the frames by welding or be fastened to the frames using bolt nuts.

The frame may be manufactured using an aluminum profile or a square metal pipe, and the overall structure and shape of the frame is formed so as to match the structure or shape of the booth for exhibition which is to be finally constructed.

Figure 19:
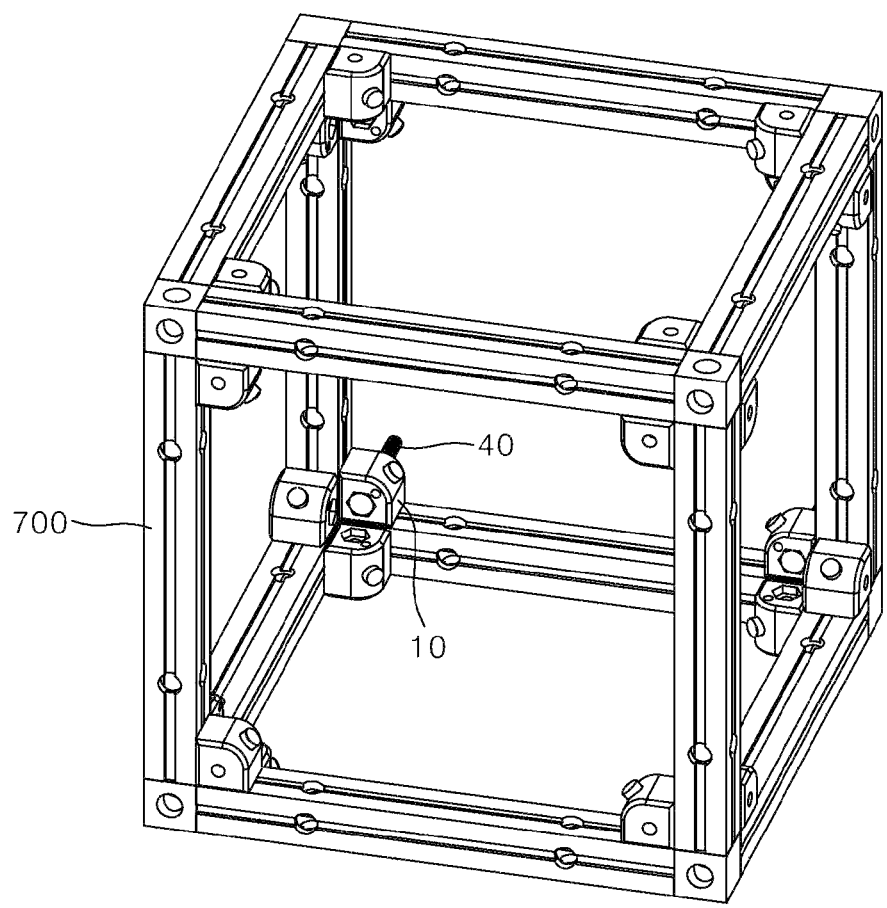
FIG. 19 is a perspective view illustrating adhesion of the main body dowel (10) to a booth module.
Figure 20:
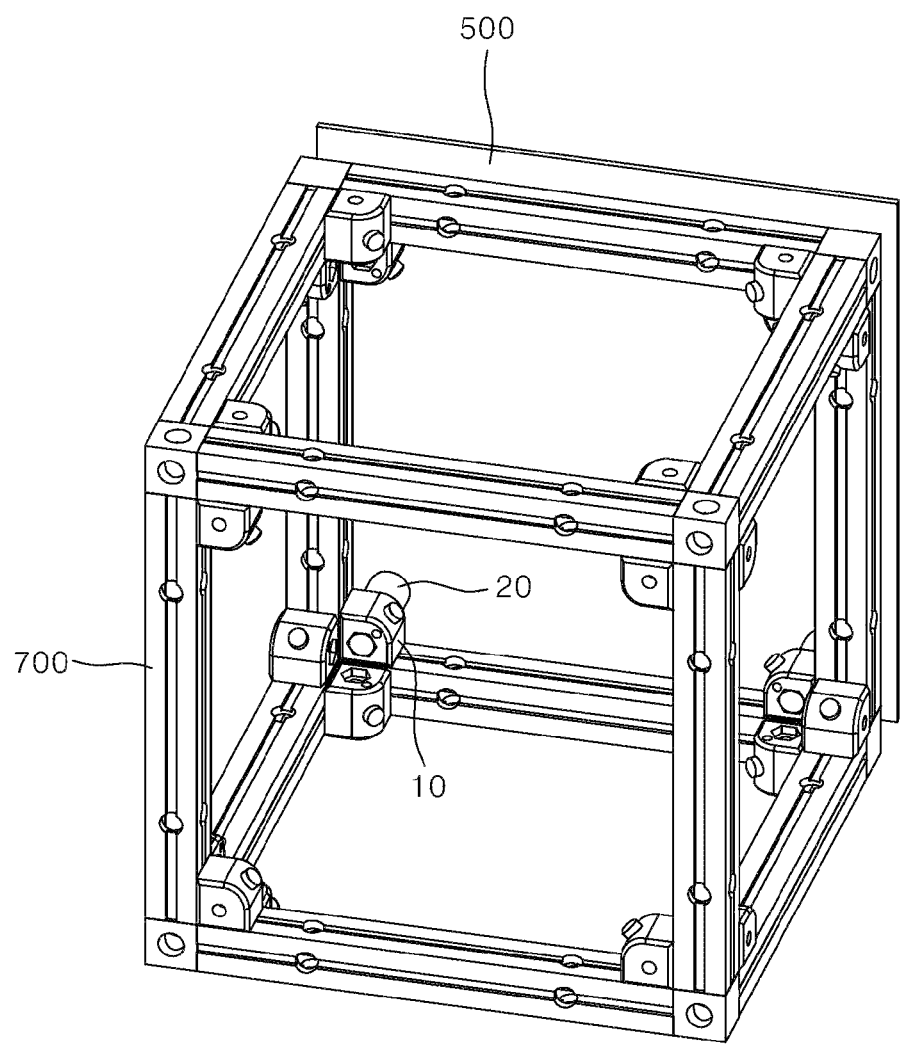
FIG. 20 is a perspective view illustrating installation of the panel (500) on the rear surface of the booth module.
Figure 21:
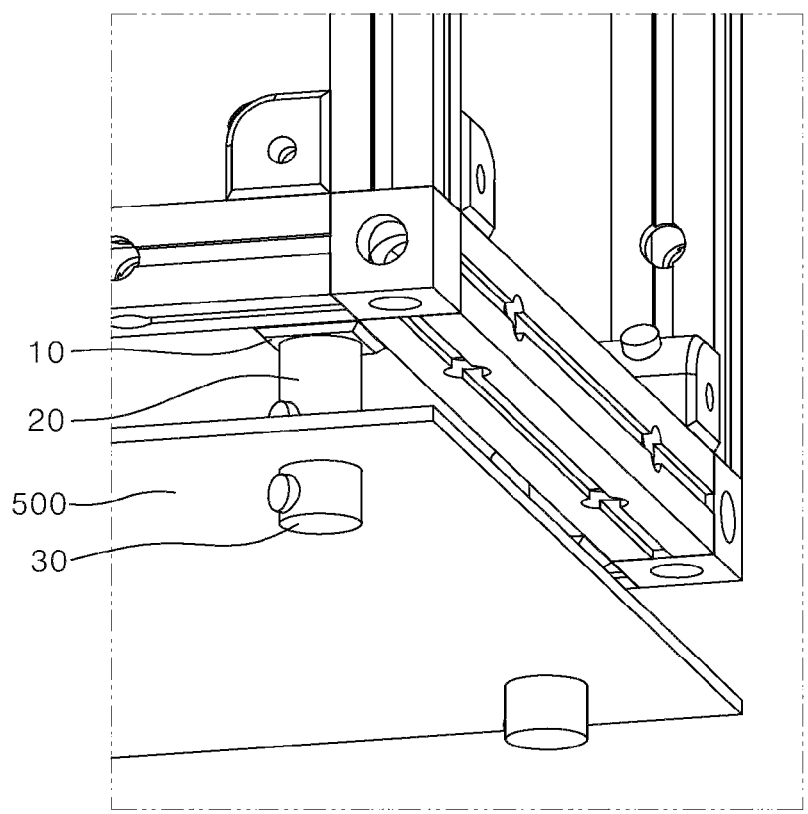
FIG. 21 is an enlarged view illustrating installation of the panel (500) on the booth module.

Although FIGS. 19 and 20 illustrate a regular hexahedral structure, a rectangular parallelepiped structure or a curved structure may be formed so as to match the structure or shape of the booth for exhibition.

The booth for exhibition excluding the intermediate dowels is constructed through a process including preparing a plurality of booth modules 700 and fastening the booth modules 700 to each other→pressing the buttons 11 of the main body dowels 10 and fastening the bolts 40 to the main body dowels 10→inserting the bolts 40 into holes of the panel 500→pressing the buttons 31 of the cap dowels 30 and fastening the cap dowels 30 to the bolts 40.

The booth for exhibition excluding the intermediate dowels is constructed through a process including preparing a plurality of booth modules 700 and fastening the booth modules 700 to each other→pressing the buttons 11 of the main body dowels 10 and fastening the bolts 40 to the main body dowels 10→pressing the buttons 21 of the intermediate dowels 20 and fastening the intermediate dowels 20 to the bolts 40→inserting the bolts 40 into holes of the panel 500→pressing the buttons 31 of the cap dowels 30 and fastening the cap dowels 30 to the bolts 40.

Therefore, the booth module for exhibition includes the frame and [ the main body dowels 10, the intermediate dowels 20, the cap dowels 30 and the bolts 40] or includes the frame and [ the main body dowels 10, the cap dowels 30 and the bolts 40], and the booth for exhibition includes a plurality of booth modules for exhibition and the panel 500 installed thereon.

Although the preferred embodiments of the present invention have been disclosed for illustrative purposes, those skilled in the art will appreciate that various modifications, additions and substitutions are possible, without departing from the scope and spirit of the invention as disclosed in the accompanying claims

The invention claimed is:

1. A booth module for exhibition configured to construct a booth for exhibition, the booth module comprising:
   a frame;
   a main body dowel;
   a bolt detachably coupled to the main body dowel; and
   a cap dowel detachably coupled to the bolt,
   wherein the main body dowel comprises a body having a bolt insertion hole formed therein, a button, a part of which is inserted into the body to be installed therein through a button installation hole formed in the body, and a spring installed inside the body so as to push one end of the button; and
   wherein the cap dowel includes a cap dowel body having a cap dowel bolt insertion hole formed therein, a cap dowel button, a part of which is inserted into the cap dowel body to be installed therein through a cap dowel button installation hole formed in the cap dowel body, and a cap dowel spring installed inside the cap dowel body so as to push one end of the cap dowel button,
   wherein the button of the man body dowel and the cap dowel button are respectively provided with bolt through holes communicating with the bolt insertion hole of the main body dowel and the cap dowel bolt insertion hole.

2. The booth module for exhibition according to claim 1, wherein:
   each of the body of the main body dowel and the cap dowel body comprises a pin hole formed in a direction parallel to a corresponding one of the bolt insertion hole of the main body and the cap dowel bolt insertion hole;
   each of the button of the main body dowel and the cap dowel button comprises a hole formed in a direction parallel to a corresponding one of the bolt through hole of the button of the main body and the bolt through hole of the cap dowel button; and
   the pin hole and a part of the hole communicate with each other and a pin is installed in the pin hole and the hole.

3. The booth module for exhibition according to claim 1, wherein a screw thread configured to be threadedly engaged with a screw thread of the bolt is formed on a portion of an inner surface of each of the bolt through hole of the button of the main body and the bolt through hole of the cap dowel button.

4. The booth module for exhibition according to claim 1, wherein the body of the main body dowel comprises front and rear surfaces, and a bolt head recess is formed on the rear surface around the bolt insertion hole of the main body dowel.

5. The booth module for exhibition according to claim 1, wherein a spring recess configured to place a corresponding one of the spring of the main body dowel and the cap dowel spring therein is formed in one end of each of the, button of the main body dowel and the cap dowel button which contacts the respective spring.

6. A booth for exhibition comprising:
   a plurality of the booth modules for exhibition according to claim 1; and
   a plurality of panels adhered to the booth modules through the bolt.

7. A method for installing a booth for exhibition, the method comprising:
  a) preparing a plurality of the booth modules for exhibition according to claim 1;
  b) pressing each button of each main body dowel and fastening each bolt to each main body dowel;
  c) inserting each bolt into holes of a panel; and
  d) pressing each button of each cap dowel and fastening each cap dowel to each bolt.

8. The method according to claim 7, wherein the preparing the booth modules comprises fastening the booth modules to each other.

* * * * *